(12) United States Patent
Langman et al.

(10) Patent No.: US 12,493,158 B2
(45) Date of Patent: Dec. 9, 2025

(54) ENVELOPE SYSTEM FOR SLACK CABLE STORAGE BOX

(71) Applicant: PPC BROADBAND, INC., East Syracuse, NY (US)

(72) Inventors: Michael Langman, East Syracuse, NY (US); Ravindra K. Vora, Freehold, NJ (US); Peter Carapella, Fayetteville, NY (US); Gerald Joseph Meier, Olathe, KS (US)

(73) Assignee: PPC BROADBAND, INC., East Syracuse, NY (US)

( * ) Notice: Subject to any disclaimer, the term of this patent is extended or adjusted under 35 U.S.C. 154(b) by 261 days.

(21) Appl. No.: 18/091,730

(22) Filed: Dec. 30, 2022

(65) Prior Publication Data
US 2023/0213718 A1 Jul. 6, 2023

Related U.S. Application Data

(60) Provisional application No. 63/295,824, filed on Dec. 31, 2021.

(51) Int. Cl.
*G02B 6/00* (2006.01)
*G02B 6/44* (2006.01)

(52) U.S. Cl.
CPC .................. *G02B 6/4446* (2013.01)

(58) Field of Classification Search
CPC .... G02B 6/4446; G02B 6/444; G02B 6/4457; G02B 6/00
See application file for complete search history.

(56) References Cited

U.S. PATENT DOCUMENTS

| | | | |
|---|---|---|---|
| 4,812,004 A | 3/1989 | Biederstedt et al. | |
| 10,031,306 B2 | 7/2018 | Sadasivan et al. | |
| 2011/0293234 A1* | 12/2011 | Srutkowski | G02B 6/445 385/135 |
| 2017/0371120 A1 | 12/2017 | Morris et al. | |
| 2020/0270094 A1* | 8/2020 | Alaerts | B65H 75/38 |

FOREIGN PATENT DOCUMENTS

| | | |
|---|---|---|
| DE | 3236213 A1 | 4/1984 |
| KR | 1020130092535 A | 8/2013 |

OTHER PUBLICATIONS

International Search Report and Written Opinion mailed Apr. 13, 2023 in corresponding International Application No. PCT/US2022/054344, 23 pages.

* cited by examiner

*Primary Examiner* — Jennifer Doan
(74) *Attorney, Agent, or Firm* — MH2 TECHNOLOGY LAW GROUP LLP

(57) ABSTRACT

A cable storage system that may include a mounting portion that is configured to extend from a wall portion of a cable storage enclosure, and an envelope portion. The envelope portion may be configured to contain a coil of cable. The envelope portion may include an envelope opening portion that may be located on an edge portion of the envelopment portion. The mounting portion may be configured to support the envelope portion though the envelope opening portion. The envelope portion may be configured to support the coil of cable in the envelope portion so as to restrict the coil of cable from expanding and interfering with contents of the cable storage enclosure.

27 Claims, 6 Drawing Sheets

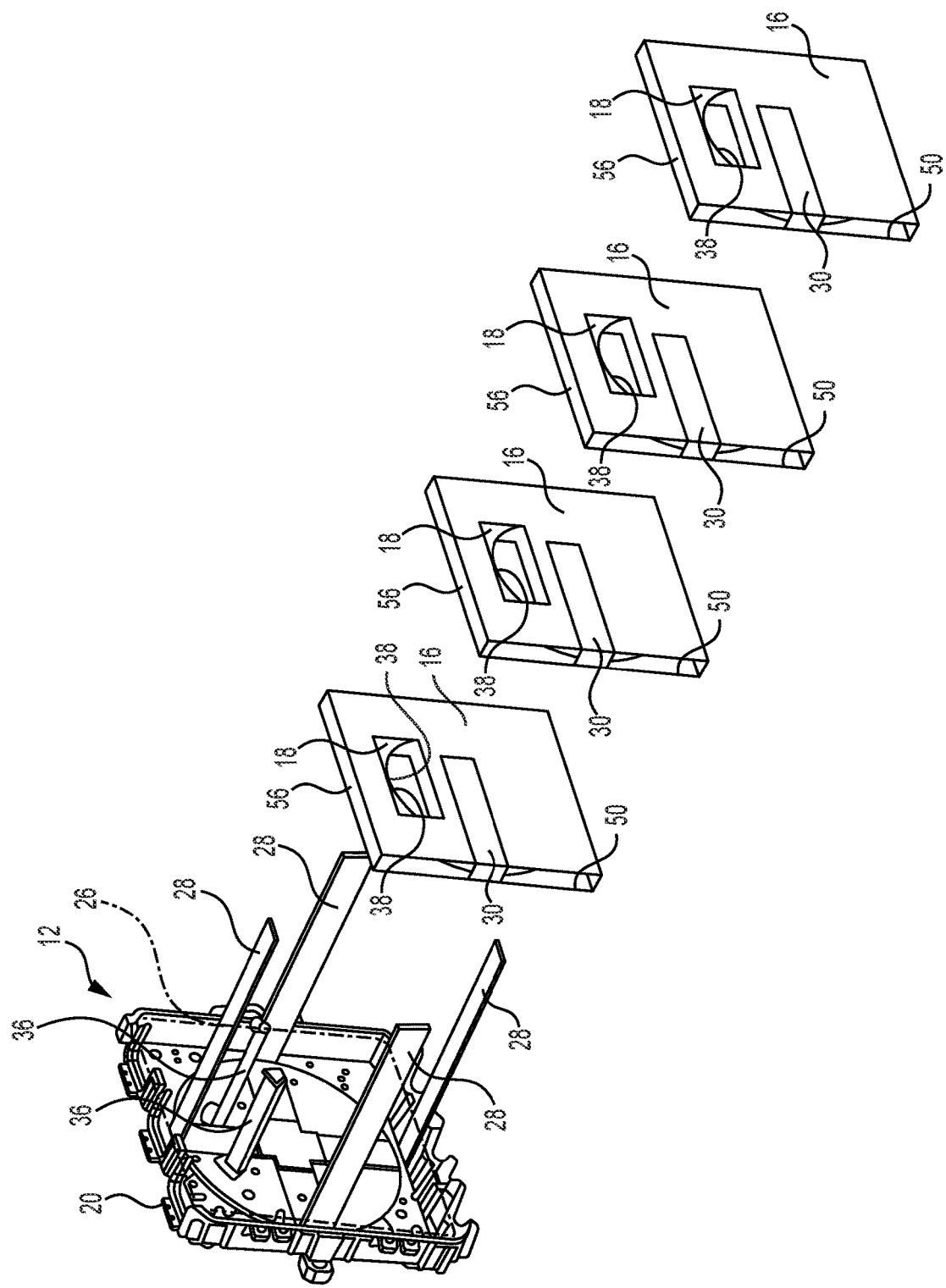

ENVELOPE SYSTEM FOR SLACK CABLE STORAGE BOX

CROSS-REFERENCE TO RELATED APPLICATION

This application claims the benefit of U.S. Provisional Application No. 63/295,824, which was filed on Dec. 31, 2021, the disclosure of which is hereby incorporated by reference herein in its entirety.

BACKGROUND

The present disclosure relates to slack cable storage in an enclosure in which multiple cable bundles can be stored. More particularly, the present invention relates to envelopes for individually storing a plurality of cables such as, for example, fiber optic cables, in an enclosure.

The telecommunications industry has recognized the many advantages of fiber optic cable, including a significantly higher bandwidth and greater performance and reliability than conventional copper wire systems. Despite the many advantages, extremely high installation costs have discouraged service providers from deploying continuous fiber optic networks extending from their central office facilities all the way to subscriber premises. As used herein, "fiber-to-the-premises" (FTTP) refers to the deployment of an optical fiber network that extends continuously to the subscriber premises. Along the primary distribution lines of a communications network, the volume of traffic and the number of customers often justify the high installation cost of optical fiber. However, thus far, the additional cost of deploying optical fiber to remote, individual subscriber premises has far outweighed the potential benefits to service providers.

Therefore, instead of implementing FTTP networks, service providers have developed various strategies to provide certain of the benefits of fiber optic networks, without actually incurring the costs associated with deploying optical fiber all the way to the home (or other subscriber premises). One such strategy is known as "fiber-to-the-curb" (FTTC), in which optical fiber extends from the service provider's central office to local terminals (also referred to as outside plant terminals, local convergence cabinets, etc.) that are situated in service areas having a high concentration of subscribers. Such FTTC systems provide certain of the benefits of an all fiber optic network, but still require the deployment of a continuous fiber optic network from the service provider's transceiving and/or switching equipment to the subscriber's transceiving equipment in order to realize the full benefit of the fiber optic network.

It is known that fiber optic cables (such as, for example, drop cables) may be efficiently connectorized in a controlled manufacturing environment, such as an optical cable assembly plant, thereby avoiding the higher material, labor and equipment costs required to connectorize cables in the field. By pre-connectorizing the fiber optic cable, the necessity of field splicing an optical fiber of the cable to, for example, an optical fiber of a distribution cable, is avoided. However, the pre-connectorized cable must be manufactured in either custom or preselected standard lengths, the former being impractical due to the higher manufacturing costs, so the latter is a preferred solution in most instances. Storing an excess length of cable that can result when deploying, for example, a standard 175-foot cable when the length of the cable actually needed is only 110 feet, can present a problem. Service providers have long desired to deploy pre-connectorized cables in order to reduce field labor and installation costs, but thus far have not been presented with an effective manner in which to store the excess length of the cable (also referred to herein as cable slack).

Therefore, it may be desirable to provide an apparatus for storing the fiber optic cable slack that results when deploying a standard length pre-connectorized cable to a subscriber premises. Further, it may be desirable to provide an apparatus that both stores multiple bundles of cable slack and substantially conceals it from view, such as a slack storage receptacle that is mounted to a wall surface of a subscriber premises, is buried in the ground, or is mounted in close proximity to a connection terminal, such as an aerial closure or an above-ground telecommunications pedestal.

It may be desirable to provide a system in which an envelope contains a coil of cable in the envelope to prevent the coil of cable from interfering with contents of the cable storage enclosure.

SUMMARY

In accordance with various embodiments of the disclosure, an envelope is configured to contain a coil of cable in the envelope so as to prevent the coil of cable from expanding and interfering with contents of a cable storage enclosure.

Embodiments of the disclosure include a cable storage system including: a base comprising a back wall, a first side wall, a second side wall, a top wall, a bottom wall, and an open front; a cover attached to the base and configured to close the open front of the base; a mounting arm configured to extend from the back wall of the base; and an envelope. The envelope is configured to contain a coil of cable; and the envelope is configured to contain the coil of cable in the envelope so as to prevent the coil of cable from expanding and interfering with contents of the base.

In embodiments, the envelope is configured to have a first side panel that is attached to a second side panel.

In embodiments, the side panels of the envelope are attached to each other and closed on all edges except one edge of the side panels.

In embodiments, the envelope is configured to be open at the one edge.

In embodiments, the envelope is configured to receive the coil of cable into the envelope through the open one edge.

In embodiments, the envelope is configured to have an opening in each of the side panels.

In embodiments, the opening in each of the side panels is configured to receive the mounting arm.

In embodiments, the mounting arm is configured to support the envelope though the openings in the side panels.

In embodiments, the open one edge of the envelope is configured to allow portions of the cable to extend out of the envelope through the open one edge.

In embodiments, the envelope includes a strap configured to provide a barrier on the one edge of the envelope to prevent the coil of cable from exiting the envelope.

In embodiments, the base includes an enclosure strap configured to extend around the envelope to secure the envelope to the base.

In embodiments, one of the first side wall, the second side wall, the top wall, and the bottom wall comprises a first port.

In embodiments, one of the first side wall, the second side wall, the top wall, and the bottom wall comprises a second port.

In embodiments, each of the first port and the second port is configured to provide an opening in the base.

In embodiments, each of the openings in the base is configured to allow the portions of the cable to exit the base.

Embodiments include a second one of the envelope, wherein the mounting arm is configured to support the second one of the envelope though the openings in the side panels of the second one of the envelope.

In embodiments, the mounting arm comprises two mounting arms.

Embodiments of the disclosure include a cable storage system including: a base portion comprising an open front; a cover portion attached to the base portion and configured to close the open front of the base portion; a mounting portion configured to extend from a wall portion of base portion; and an envelope portion. The envelope portion is configured to contain a coil of cable; and the envelope portion is configured to contain the coil of cable in the envelope portion so as to prevent the coil of cable from expanding and interfering with contents of the cable storage enclosure.

In embodiments, the envelope portion is configured to have a first side panel portion that is attached to a second side panel portion.

In embodiments, the side panel portions of the envelope are attached to each other and closed on all edges except one edge of the side panel portions.

In embodiments, the envelope portion is configured to be open at the one edge.

In embodiments, the mounting portion is configured to support the envelope portion though openings in the side panel portions.

In embodiments, the one open edge of the envelope portion is configured to allow portions of the cable to extend out of the envelope portion through the open one edge.

In embodiments, the envelope portion is configured to receive the coil of cable into the envelope portion through the open one edge.

In embodiments, the mounting portion is a mounting arm.

In embodiments, the mounting arm comprises two mounting arms.

In embodiments, the mounting arm is configured to extend from a back wall portion of the base portion.

In embodiments, the openings in the side panel portions comprise one opening in each of the side panel portions.

In embodiments, a coil retention portion is attached to the envelope portion and is configured to provide a barrier on the open one edge of the envelope portion to prevent the coil of cable from exiting the envelope portion.

In embodiments, an envelope retention portion is configured to be attached to the base portion and is configured to extend around the envelope portion to secure the envelope portion to the base portion.

In embodiments, the coil retention portion is a strap.

Embodiments further include a second one of the envelope portion, wherein the mounting portion is configured to support the second one of the envelope portion though the openings in the side panels of the second one of the envelope portion.

In embodiments, the side panel portions of the envelope portion are configured to be square.

Embodiments of the disclosure include a cable storage system including: a mounting portion configured to extend from a wall portion of a cable storage enclosure; and an envelope portion. The envelope portion is configured to contain a coil of cable; and the envelope portion is configured to contain the coil of cable in the envelope portion so as to prevent the coil of cable from expanding and interfering with contents of the cable storage enclosure.

In embodiments, the envelope portion is configured to be open on only one edge.

In embodiments, the mounting portion is configured to support the envelope portion though an opening in the envelope portion.

In embodiments, the envelope portion is configured to have a first side panel portion that is attached to a second side panel portion.

In embodiments, the side panel portions of the envelope are attached to each other and closed on all edges except the open one edge of the envelope portion.

In embodiments, the one edge of the envelope portion is configured to allow portions of the cable to extend out of the envelope portion through the open one edge.

In embodiments, a coil retention portion is attached to the envelope portion and is configured to provide a barrier on the open one edge of the envelope portion to prevent the coil of cable from exiting the envelope portion.

Embodiments include a second one of the envelope portion, wherein the mounting portion is configured to support the second one of the envelope portion though the opening in the second one of the envelope portion.

In embodiments, the mounting portion is a mounting arm.

In embodiments, the mounting arm comprises two mounting arms.

Various aspects of the slack storage system, as well as other embodiments, objects, features and advantages of this disclosure, will be apparent from the following detailed description of illustrative embodiments thereof, which is to be read in conjunction with the accompanying drawings.

BRIEF DESCRIPTION OF THE DRAWINGS

FIG. 5 is an expanded view of the slack cable storage enclosure of FIG. 1 and a plurality of the envelopes of FIG. 4.

DETAILED DESCRIPTION OF EMBODIMENTS

In accordance with various embodiments of the disclosure, a system includes one or more envelopes that each contains a coil of cable in the envelope to prevent the coil of cable from expanding and interfering with contents of the cable storage enclosure.

It is to be understood that this present disclosure is not limited to the specific embodiments and methods described below, as specific components and/or conditions may vary.

Furthermore, the terminology used herein is used only for the purpose of describing particular embodiments of the present disclosure and is not intended to be limiting in any way.

Figure 8:
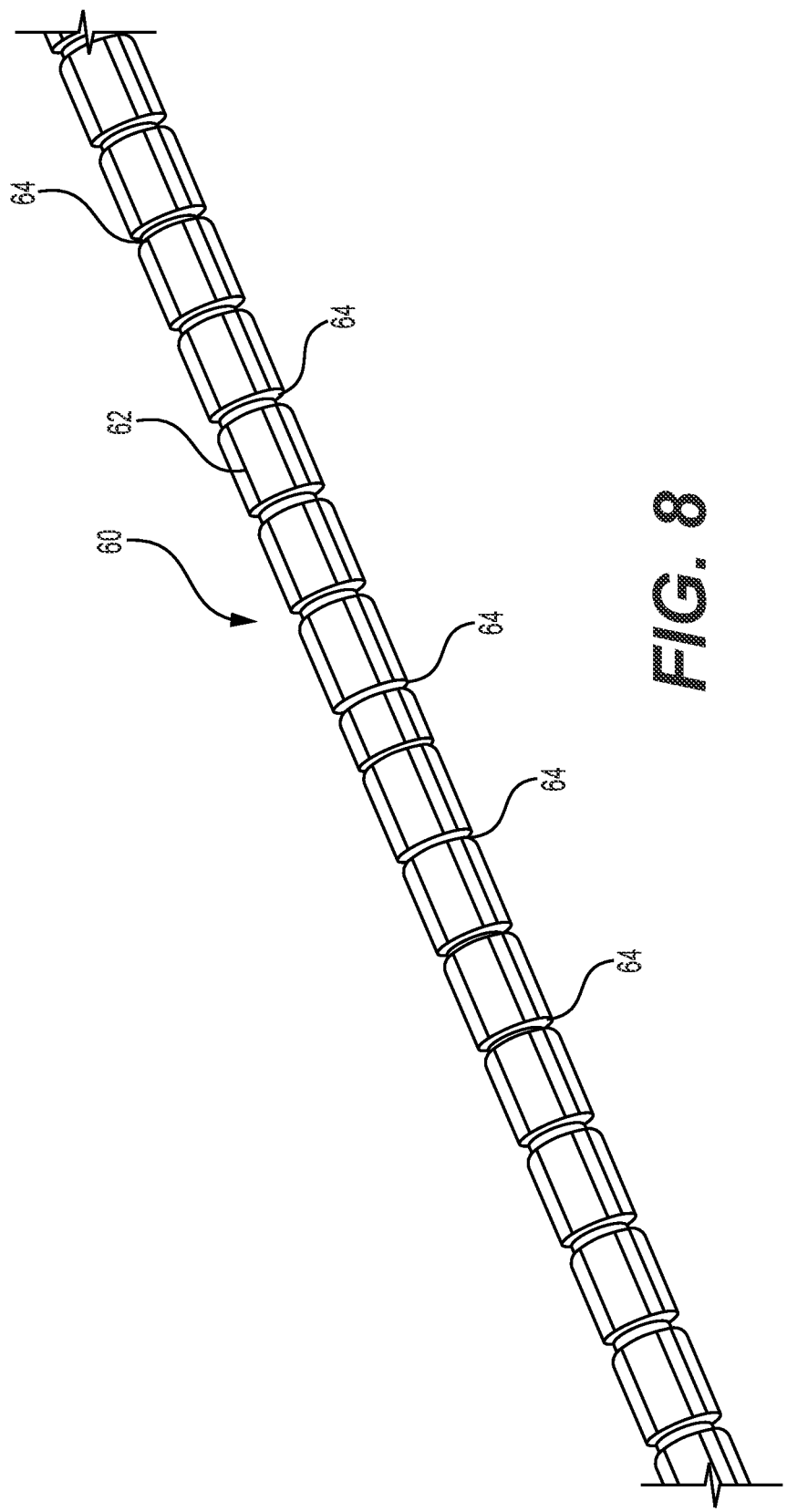
FIG. 8 is a partial perspective view of an exemplary semi-rigid cable.

Semi-rigid cables such as, for example, the cable 60 shown in FIG. 8, tend to unwind when bundled in a loop. As shown in FIG. 8, the cable 60 has a semi-rigid outer surface 62 with spaced annular ridges 64. This construction tends to urge the cable 60 to unwind when bundled. Therefore, in circumstances where bundles of semi-rigid cables must be stored, there is a need to compactly store the bundled cables such that the bundled cables do not unwind and possibly interfere with each other.

In embodiments, coils of cable slack can be inserted into thin mesh bags. In embodiments, the bags are 7 inches wide and 7 inches tall, and the thickness is sufficient to accommodate a 50 foot cable bundle (or coil). In embodiments, the bag can accept a cable bundle having a diameter of from 7 to 4 inches at the smallest. In embodiments, the bags have a slot opening on the side where the cable bundle goes in. In embodiments, here is a strap with a snap button that goes over the slot opening and retains the cable bundle in the bag. Having a strap instead of a complete closure of the slot allows the cable input and output to enter and exit the bag. In embodiments, the bag has a rectangular (or other shape) hole through it. The bag can be hung through the hole on a plastic rack inside a slack storage terminal. In embodiments, the rack is two prongs on a plastic disk, attached to the terminal with screws. A technician can hang a plurality of the bags on the two-pronged rack, and can take them off if needed. Once the technician is done hanging the bags, embodiments include, for example, two sets of hook and loop straps, one horizontal and one vertical, that go behind the plastic rack, and can be brought across the bags to secure the bags to the to slack storage terminal. Then, the technician can easily close the terminal door without pinching cables. The bags of cable can be compressed as the terminal door closes, unlike hard boxes or containers.

Figure 2:
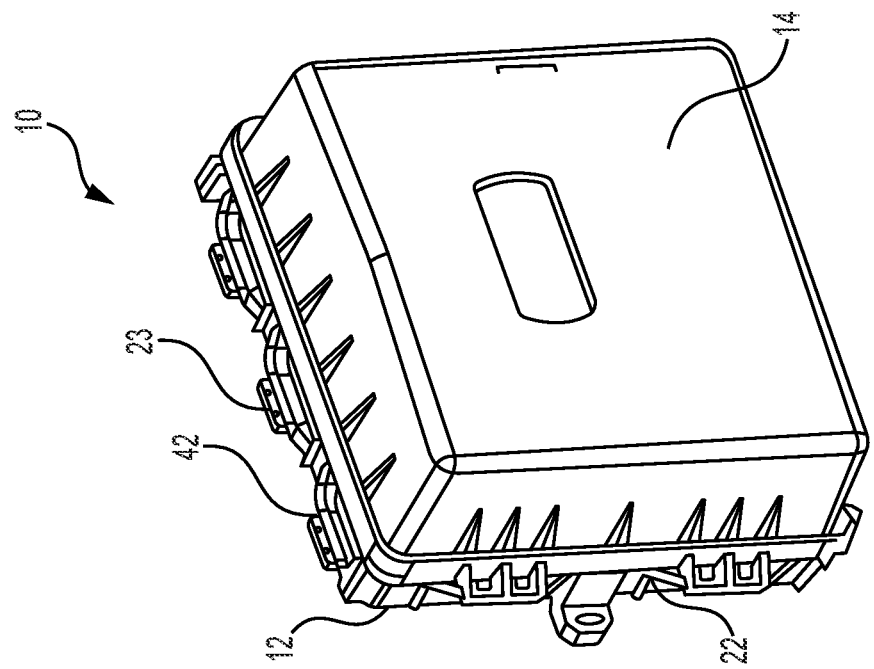
FIG. 2 is a perspective view of the slack cable storage enclosure of FIG. 1 with its cover in a closed position.
Figure 1:
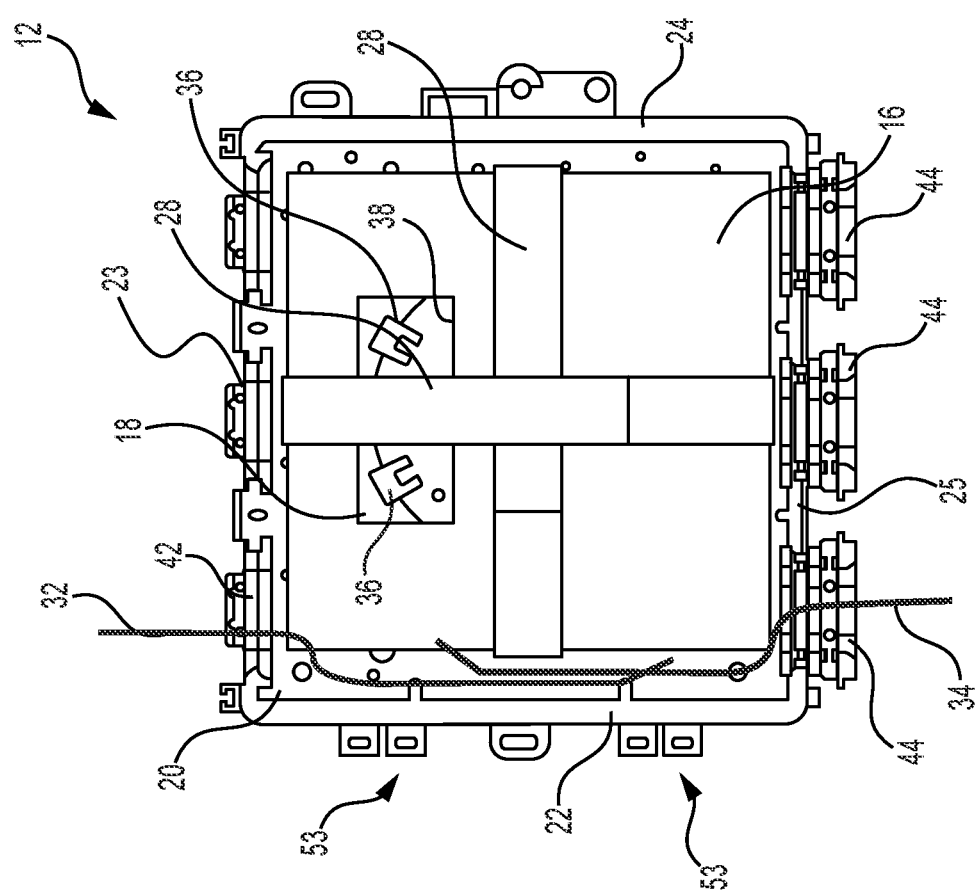
FIG. 1 is a front view of an exemplary slack cable storage enclosure in accordance with various aspects of the disclosure with its cover removed.

FIGS. 1 and 2 show an example of a slack cable storage enclosure 10 that includes a base 12 and a cover 14. In this example, a plurality of envelopes 16 are shown, each of which houses one or more slack cable storage bundles 18. The base 12 includes a back wall 20, a first side wall 22, a second side wall 24, a top panel 23, a bottom panel 25, and a front opening 26 (see FIG. 5). The cover 14 is configured to close off the front opening 26 defined by the enclosure 12. One or more straps 28 can be mounted to the backwall 20 or side walls 22, 24 of the enclosure 12. In embodiments, each strap 28 is configured to secure the envelopes 16 to the enclosure 12. In embodiments, the straps 28 include hook and loop fasteners to secure the straps 28 in place. In embodiments, the straps 28 include a snap or other fastener to secure the straps 28 in place.

Figure 3:
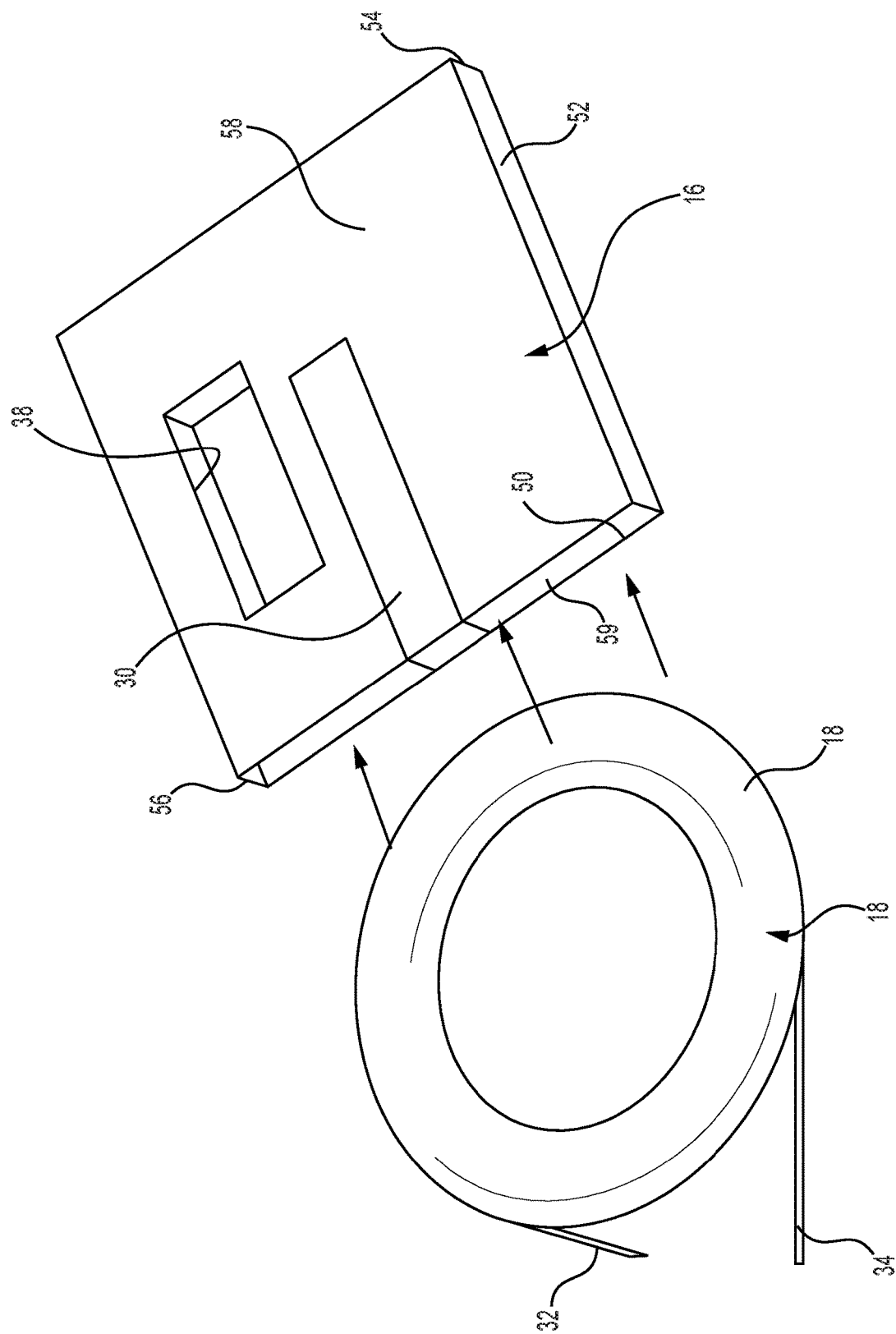
FIG. 3 is a perspective view of an exemplary envelope in accordance with various aspects of the disclosure and a cable bundle prior to inserting the cable bundle into the envelope.

FIG. 3 shows an exemplary envelope 16 and an exemplary cable bundle 18. In embodiments, an envelope strap 30 is attached to the envelope 16 to secure the cable bundle 18 in the envelope 16. Prior to inserting the cable bundle 18 into the envelope 16, a portion of the envelope strap 30 is removed from the envelope 16 to allow the cable bundle 18 to be inserted into the envelope 16. The envelope strap 30 can use, for example, a hook and loop fastener or a snap fastener to secure the openable portion of the envelope strap 30 to the envelope 16. In embodiments, the envelope 16 is made of a rigid material and/or a flexible material. In embodiments, the envelope 16 is made of a polymeric material or a mesh material.

Figure 4:
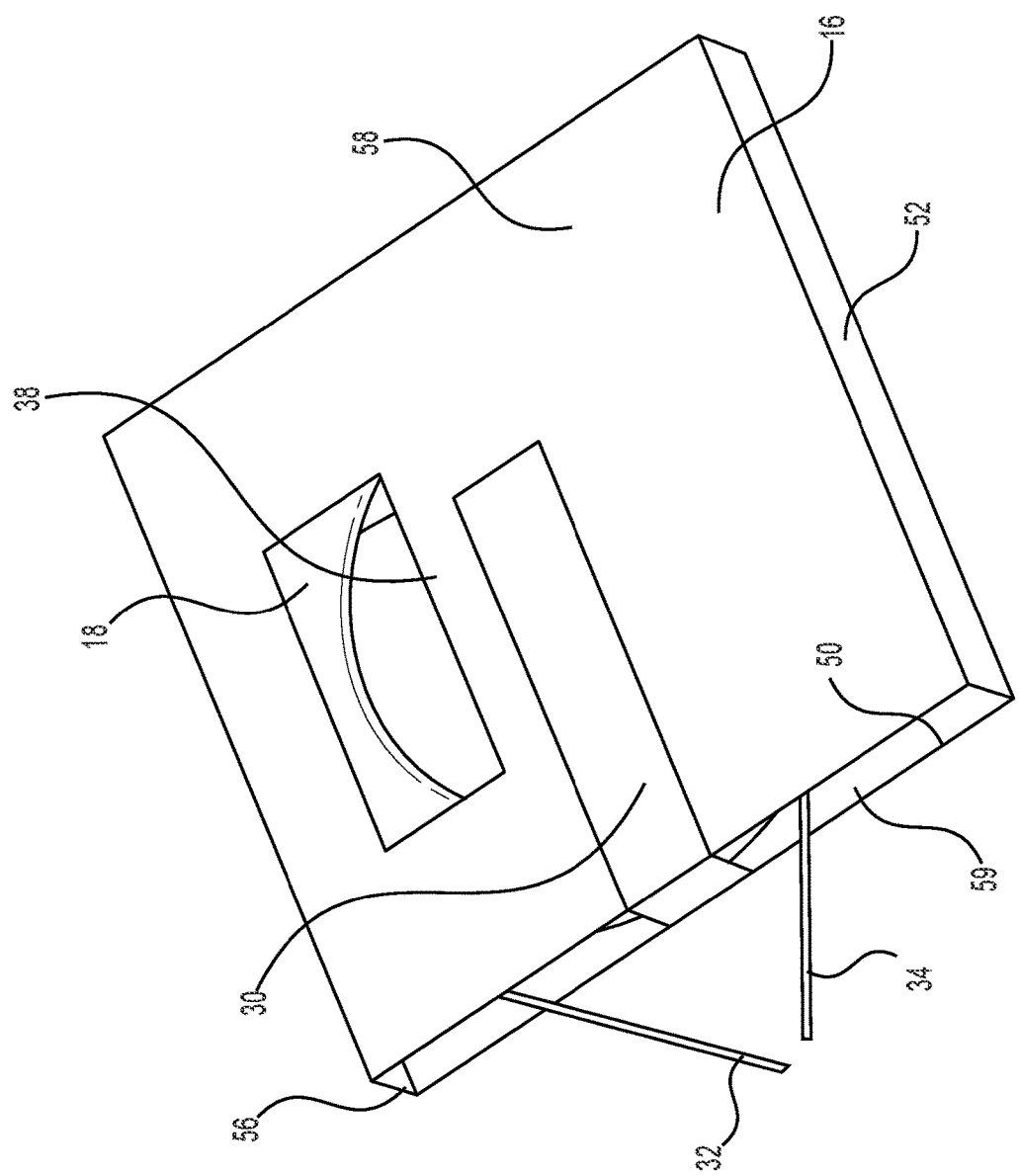
FIG. 4 is a perspective view of the envelope of FIG. 3 with the cable bundle in the envelope.

In the example shown in FIGS. 3 and 4, the envelope 16 has one open side 50 and three closed sides 52, 54, 56. In this example, the envelope strap 30 is mounted to the envelope 16 and is configured to block a portion of the open side 50 to keep the cable bundle 18 substantially within the envelope 16, as shown in FIG. 4.

One or more of the envelope 16 can be mounted onto the base 12 of enclosure 10 such that the open side 50 of each envelope 16 is disposed proximate to a hinge region 53 of the base 12. The example shown in FIGS. 3 and 4 has a front side 58 and a back side 59 disposed opposite the front side 58. A first portion 32 and a second portion 34 of the cable 18 which is bundled into the envelope 16 can extend out of the envelope 16 as shown in FIGS. 3 and 4.

Figure 7:
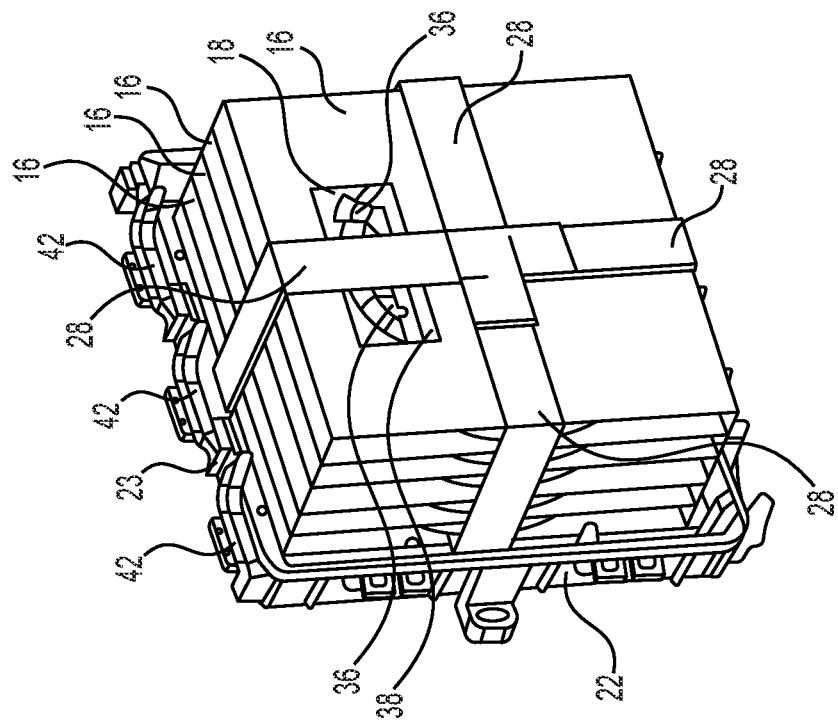
FIG. 7 is a perspective view of the slack cable storage enclosure of FIG. 6 with the envelopes and cable bundles mounted on the arms of the enclosure and the strapped onto the enclosure.
Figure 6:
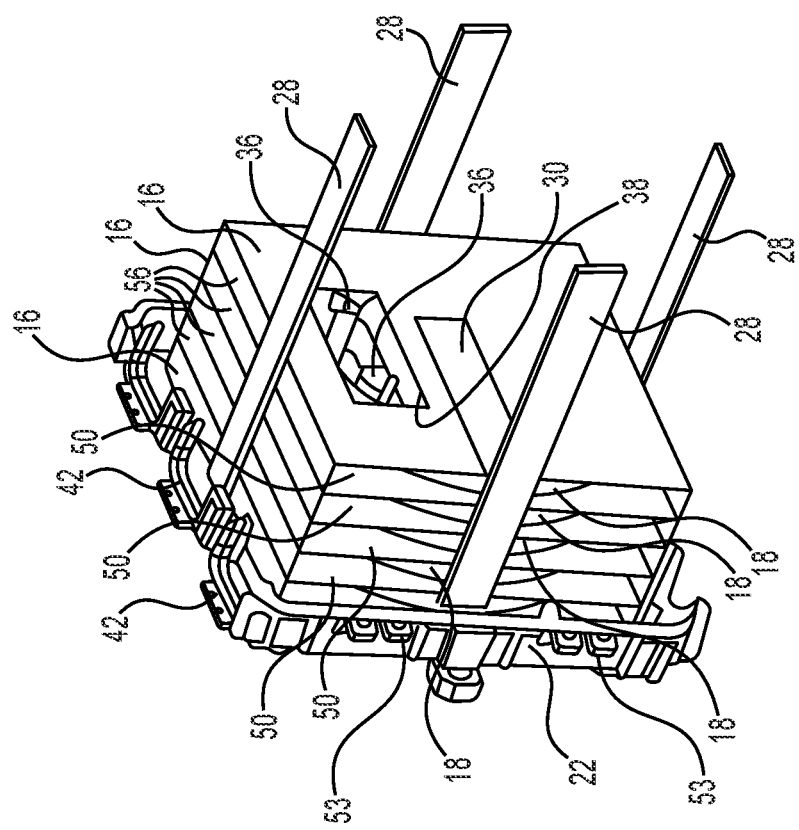
FIG. 6 is a perspective view of the slack cable storage enclosure of FIG. 5 with the envelopes and cable bundles mounted on arms of the enclosure.

In this example, and shown in FIGS. 1 and 5, the base 12 includes one or more arms 36 which extend away from the back wall 20 of the base 12. In this example, two of the arms 36 extend substantially perpendicularly from the back wall 20 of the base 12. Other examples include fewer or more of the arms 36. As shown in FIG. 3, each envelope 16 has an opening 38 through which the arms 36 can extend. As shown in FIGS. 6 and 7, the arms 36 of the base 12 are configured to support each of the envelopes 16 by extending through the opening 38.

As shown in FIGS. 6 and 7, once all of the envelopes 16 are mounted on the arms 36, one or more base straps 28 are used to secure the envelopes 16 to the base 12. Similar to the envelope straps 30, the base straps 28 can be secured to each other (or some other structure) by hook and loop fasteners, snap fasteners, or other fasteners. Alternatively, the base straps 40 can be tied together to secure the envelopes 16 to the base 12.

As shown in FIG. 1, the portions 32, 34 of each bundled cable 18 can be routed out of the enclosure 10. In this example, the first portion 32 of each bundled cable 18 is routed to a port 42 in the top panel 23 of the base 12 and the second portion 34 of each bundled cable 18 is routed to a port 44 in the bottom panel 25 of the base 12. With reference to back to FIG. 2, the enclosure opening 26 can be closed off by the cover 14, thereby forming the enclosure 10.

While multiple exemplary non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A cable storage system comprising:
   a base comprising a back wall, a first side wall, a second side wall, a top wall, a bottom wall, and an open front;
   a cover attached to the base and configured to close the open front of the base;
   a mounting arm configured to extend from the back wall of the base;
   an envelope;
   wherein the envelope is configured to contain a coil of cable;
   wherein the envelope is configured to have a first side panel that is attached to a second side panel;
   wherein the side panels of the envelope are attached to each other and closed on all edges except one edge of the side panels;
   wherein the envelope includes an envelope opening;
   wherein the envelope opening is located at an edge portion of the envelope;
   wherein the envelope is configured to receive the coil of cable into the envelope through the envelope opening;
   wherein the envelope is configured to have an opening in each of the side panels;
   wherein the opening in each of the side panels is configured to receive the mounting arm;
   wherein the mounting arm is configured to support the envelope though the envelope opening;
   wherein the envelope opening is configured to allow portions of the cable to extend out of the envelope through the open one edge;
   wherein the envelope includes an envelope opening barrier strap that is configured to provide a barrier to the envelope opening so as to restrict the coil of cable from exiting the envelope;
   wherein the base includes a base securing enclosure strap that is configured to extend around the envelope and secure the envelope to the base;
   wherein one of the first side wall, the second side wall, the top wall, or the bottom wall comprises a first port;
   wherein one of the first side wall, the second side wall, the top wall, or the bottom wall comprises a second port;
   wherein each of the first port and the second port is configured to provide a base opening in the base;
   wherein each base opening is configured to allow a portion of the cable to exit the base; and
   wherein the envelope is configured to restrict the coil of cable in the envelope so as to prevent the coil of cable from expanding and interfering with contents of the base.

2. The system of claim 1, wherein the envelope comprises a first envelope, the envelope opening comprises a first envelope opening, further comprising a second envelope having a second envelope opening, and wherein the mounting arm is configured to support the second envelope though the second envelop opening.

3. The system of claim 1, wherein the mounting arm comprises two mounting arms.

4. A cable storage system comprising:
   a base portion having a base wall portion and a base opening portion;
   a cover portion configured to be attached to the base portion so as to cover the base opening portion;
   a mounting portion configured to extend from the base wall portion;
   an envelope portion having a first side envelope panel portion that includes a plurality of first closed side envelope panel edge portions, a second side envelope panel portion that includes a plurality of second closed side envelope panel edge portions that are each attached to a respective one of the first closed side envelope panel edge portions so as to form a plurality of first and second closed side envelope panel edge portions;
   wherein the envelope portion is configured to support a coil of cable;
   wherein the first side envelope panel portion includes a first open side envelope panel edge portion and the second side envelope panel portion includes a second open side envelope panel edge portion that is configured to be oriented relative to the first open side envelope panel edge portion so as to form a side edge envelope panel opening between the first and second open side envelope panel edge portions;
   wherein the first side envelope panel portion includes a first side envelope panel opening portion and the second side envelope panel portion includes a second side envelope panel opening portion;
   wherein the mounting portion is configured to support the envelope portion through the first side envelope panel opening portion and/or the second side envelope panel opening portion;
   wherein the side edge envelope panel opening is configured to allow portions of the cable to extend out of the envelope portion through the side edge envelope panel opening; and
   wherein the envelope portion is configured to support the coil of cable in the envelope portion so as to restrict the coil of cable from expanding and interfering with contents of the cable storage enclosure.

5. The system of claim 4, wherein the envelope portion is configured to receive the coil of cable into the envelope portion through the side edge envelope panel opening.

6. The system of claim 4, wherein the mounting portion comprises a mounting arm.

7. The system of claim 6, wherein the mounting arm comprises two mounting arms.

8. The system of claim 6, wherein the mounting arm is configured to extend from a back wall portion of the base portion.

9. The system of claim 6, wherein the base opening portion comprises a front base opening portion.

10. The system of claim 4, wherein a coil retention portion is attached to the envelope portion and is configured to provide a barrier to the side edge envelope panel opening to restrict the coil of cable from exiting the envelope portion.

11. The system of claim 4, wherein an envelope retention portion is configured to be attached to the base portion and is configured to extend around the envelope portion to secure the envelope portion to the base portion.

12. The system of claim 4, wherein the coil retention portion is a strap.

13. The system of claim 4, wherein the envelope portion comprises a first envelope portion, further comprising a second envelope portion, and wherein the mounting portion is configured to support the second envelope portion.

14. The system of claim 4, wherein the side panel portions of the envelope portion are configured to be square.

15. The system of claim 4, wherein the side edge envelope panel opening between the first and second open side envelope panel edge portions comprises only a single side envelope panel opening between the first and second open side envelope panel edge portions.

16. The system of claim 4, wherein the side edge envelope panel opening between the first and second open side envelope panel edge portions comprises the only side envelope panel opening between the first and second open side envelope panel edge portions.

17. A cable storage system comprising:
- a mounting portion configured to extend from a wall portion of a cable storage enclosure;
- an envelope portion having a first side panel portion attached to a second side panel portion so as to form a side edge envelope panel opening and configured to support a coil of cable;
- wherein the mounting portion is configured to support the envelope portion through an envelope opening portion in each of the first and second side panel portions; and
- wherein the envelope portion is configured to restrict the coil of cable supported by the envelope portion from expanding and interfering with contents of the cable storage enclosure.

18. The system of claim 17, wherein the envelope portion is configured to contain, encircle, and/or surround the coil of cable.

19. The system of claim 17, wherein the side edge envelope panel opening comprises only a single side edge envelope panel opening.

20. The system of claim 17, wherein the envelope portion is configured to prevent the coil of cable supported by the envelope portion from expanding and interfering with contents of the cable storage enclosure.

21. The system of claim 17, wherein the envelope portion is configured to allow portions of the cable to extend out of the envelope portion through the side edge envelope panel opening.

22. The system of claim 17, further comprising a coil retention portion that is configured to be attached to the envelope portion so as to provide a barrier to the side edge envelope panel opening and prevent the coil of cable from exiting the envelope portion.

23. The system of claim 17, wherein the envelope portion comprises a first envelope portion, further comprising a second envelope portion having a second envelope opening portion, and wherein the mounting portion is configured to support the second envelope portion though the second envelope opening portion.

24. The system of claim 17, wherein the mounting portion comprises a mounting arm.

25. The system of claim 24, wherein the mounting arm comprises two mounting arms.

26. The system of claim 17, wherein the envelope portion includes a coil retention portion configured to provide a barrier to the side edge envelope panel opening to restrict the coil of cable from exiting the envelope portion.

27. The system of claim 17, wherein the envelope portion is configured to receive the mounting portion through the coil of cable.

* * * * *